United States Patent
Huang et al.

(10) Patent No.: US 11,080,750 B2
(45) Date of Patent: Aug. 3, 2021

(54) PRODUCT PRESENTATION

(71) Applicant: International Business Machines Corporation, Armonk, NY (US)

(72) Inventors: Tina Huang, Taipei (TW); Sunny Liu, Kaohsiung (TW); Clement Su, Taipei (TW); Jason C S Yang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 15/791,811

(22) Filed: Oct. 24, 2017

(65) Prior Publication Data

US 2019/0122262 A1   Apr. 25, 2019

(51) Int. Cl.
*G06Q 30/00* (2012.01)
*G06Q 30/02* (2012.01)
*G06K 19/06* (2006.01)
*G06K 7/14* (2006.01)
*G05B 19/418* (2006.01)
*G06K 9/20* (2006.01)
*G06K 9/46* (2006.01)
*G06K 9/00* (2006.01)

(52) U.S. Cl.
CPC ........ *G06Q 30/0261* (2013.01); *G06K 7/1417* (2013.01); *G06K 19/06037* (2013.01); *G06K 9/00624* (2013.01); *G06K 9/209* (2013.01); *G06K 9/46* (2013.01); *G06K 2209/27* (2013.01)

(58) Field of Classification Search
CPC ............ G06Q 30/0261; G06K 7/1417; G06K 19/06037; G06K 9/00624; G06K 2209/27; G06K 9/46; G06K 9/209
See application file for complete search history.

(56) References Cited

U.S. PATENT DOCUMENTS

| | | | |
|---|---|---|---|
| 7,715,596 B2* | 5/2010 | Gehlen | G06K 9/036 382/112 |
| 9,762,750 B2* | 9/2017 | Huber | G06T 7/41 |
| 2009/0171786 A1 | 7/2009 | Kuo et al. | |
| 2013/0142442 A1* | 6/2013 | Metayer | G06K 9/3216 382/218 |
| 2013/0211893 A1 | 8/2013 | Bryant et al. | |
| 2014/0222612 A1* | 8/2014 | Knudson | G06Q 30/00 705/26.7 |
| 2015/0012362 A1* | 1/2015 | Coon | G06Q 30/0269 705/14.66 |
| 2016/0292780 A1* | 10/2016 | Ren | G06K 9/46 |
| 2017/0061460 A1* | 3/2017 | Kwon | G06Q 30/0214 |

OTHER PUBLICATIONS

"User profile based product recommendation on android platform". IEEE (Year: 2014).*

* cited by examiner

*Primary Examiner* — Maria V Vanderhorst
(74) *Attorney, Agent, or Firm* — Schmeiser, Olsen & Watts, LLP; William Hartwell (57) ABSTRACT

A method and associated computer system and computer program product. An image is obtained of a product recommender who is interacting with a product. The product recommender is identified based on the image. Information on the product is provided based on the identified product recommender.

6 Claims, 6 Drawing Sheets

Recommender:
Clement

Likes:
4353

Product Link:

Nearby:
10m

PRODUCT PRESENTATION

TECHNICAL FIELD

The present invention relates generally to computer technology, and more specifically, to a method and system for product presentation.

BACKGROUND

Generally a product may be presented to potential target people-through many ways for various purposes. Traditional product presentation may include advertisements of products or popularization of scientific information of a product to those people who may be interested in newspapers, magazines, posters, radio, or television. Nowadays, Internet related media, such as emails, web pages, social network, are also used for the product presentation. For example, advertisement is one of typical ways to promote and present products to potential customers, especially consumer products.

SUMMARY

Embodiments of the present invention provide a method and associated computer system and computer program product. One or more processors of the computer system obtain an image of a product recommender who is interacting with a product. The one or more processors identify the product recommender based on the image. The one or more processors provide information on the product based on the identified product recommender.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Some embodiments will be described in more detail with reference to the accompanying drawings, in which the embodiments of the present invention have been illustrated. However, the present invention can be implemented in various manners, and thus should not be construed to be limited to the embodiments disclosed herein.

Figure 1:
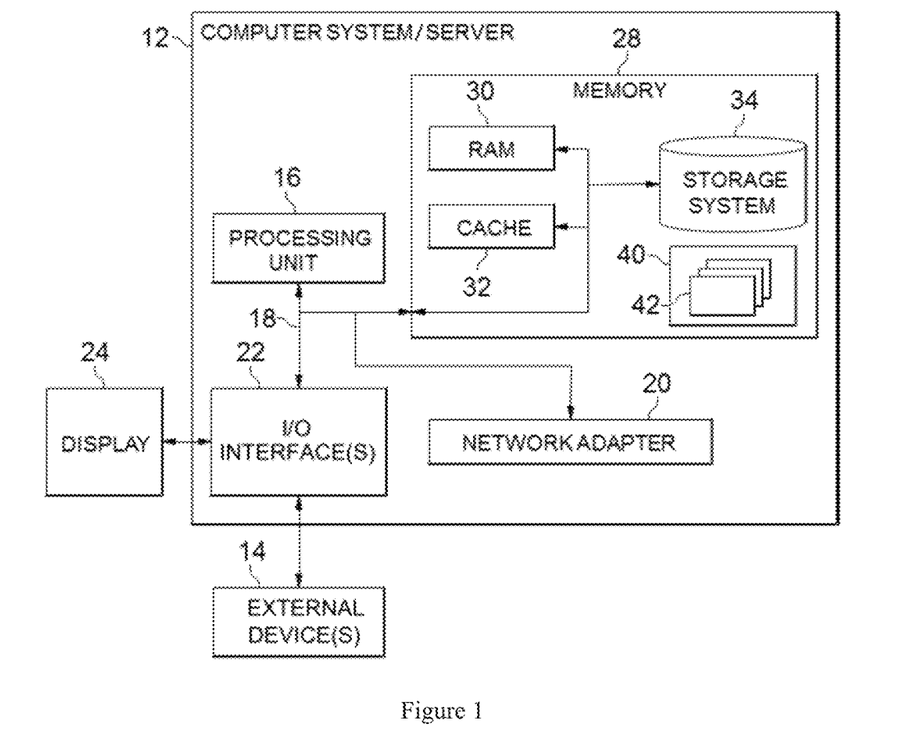
FIG. 1 shows an exemplary computer system/server which is configured to implement embodiments of the present invention.

FIG. 1 shows an exemplary computer system/server 12 which is configured to implement embodiments of the present invention. FIG. 1 is also depicts an illustrative example of a portable electronic device such as a communication device which is configured to implement the embodiments of the present invention. Computer system/server 12 is only illustrative and is not intended to suggest any limitation as to the scope of use or functionality of embodiments of the invention described herein.

The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer readable hardware media. Such hardware media may be any available hardware media that is accessible by computer system/server 12, and includes both volatile and non-volatile media, as well as removable and non-removable media.

System memory 28 can include computer readable hardware media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each medium can be connected to bus 18 by one or more data media interfaces. As will be further depicted and described below, memory 28 may include a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12;

and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, Redundant Array of Independent Disks (RAID) systems, tape drives, and data archival storage systems, etc.

With the current product presentation approaches, the potential customers usually cannot realistically understand the product. A realistic presentation is more convincing to the potential customers. For example, while walking on a street, the potential customer might see a person who is wearing, carrying or using a product the potential customer is interested in, but cannot know what brand the product is if the potential customer does not ask the person. Thus an opportunity to present and promote this product could be missed.

Therefore it is desirable to provide a new mechanism for the potential customer to get information on (i.e., about) the product the potential customer is interested in when the potential customer sees the product.

Figure 2:
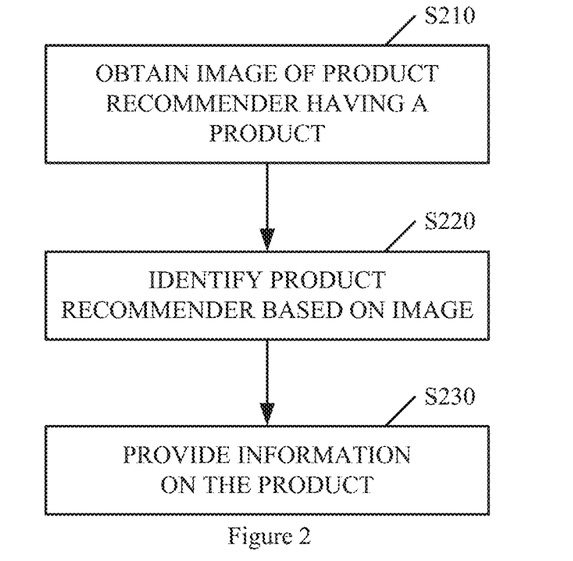
FIG. 2 shows a flowchart of a method for product presentation according to an embodiment of the present invention.

FIG. 2 shows a flowchart of a method for product presentation according to an embodiment of the present invention. The embodiment will be described in detail in conjunction with the figures. A person skilled in the art will appreciate that the method for product presentation may be implemented by any kind of computing device, such as the computer system/server 12 as shown in FIG. 1.

According to embodiments of the present invention, the method of the embodiment is to utilize a product recommender to promote one or more products, and provide information on the product(s) for a potential customer. Herein, the product recommender means a person who wants to promote the product. The product may be any consumer product to be advertised, for example, clothes, hats, shoes, bags, accessories, etc. The product may be provided by various product providers. The product recommender may register with one or more product providers, and obtain the product(s) from the product provider. The registration of the product recommender may include photographing and/or scanning the product recommender to provide and store a reference photograph and/or scan of the product recommender for subsequent comparison with a scanned and/or photographed image of a candidate product recommender to identify the actual product recommender as described infra in conjunction with steps S210 and S220 in FIG. 1. The product recommender may wear, carry or use the product for promotion. Each of the product providers may have a list of the registered product recommenders and associate the registered product recommenders with the products provided to the registered product recommender. Therefore there is an association among the product recommender, the products which the product recommender can promote, and the product provider, as shown in Table 1. In some embodiments of the present invention, such association may be provided to and stored in the computing device. The potential customer may be a person who sees the product recommender and is interested in the products worn, carried, or used by the product recommender.

TABLE 1

| An example of the association | | |
|---|---|---|
| Identifier of Product Recommender | Identifier of Product | Identifier of Product Provider |
| Alice | 001 | A |
| Alice | 002 | A |
| Betty | 003 | A |
| Clement | 004 | B |
| Daisy | 005 | B |
| Daisy | 006 | C |

As seen from Table 1, Alice and Betty register with the product provider A. Alice promotes the products 001, 002 from the product provider A, and Betty promotes the product 003 from the product provider A. Clement promotes the product 004 from the product provider B. Daisy registers with the product providers B and C, and promotes the product 005 from the product provider B and the product 006 from the product provider C.

As shown in FIG. 2, at step S210, the computing device may obtain an image of the product recommender who is interacting with (e.g., wearing, carrying, using) one or more products. For example, the product recommender may wear a white shirt and a hat, and/or carry a bag.

In some embodiments of the present invention, the image may be provided by the potential customer. The potential customer may see the product recommender who is wearing, carrying or using the products and is interested in one or more of the products. The potential customer then may use the potential customer's electronic device to capture an image of the product recommender by taking a photograph or video of the product recommender or scanning the product recommender. The image may be provided to the computing device.

In one technologically useful embodiment, the image, which may be provided by the potential customer or obtained in another manner, may comprise both a photograph and a scan of the product recommender.

Then at step S220, the computing device may identify the product recommender based on performing a digital comparison between the captured image and the reference image obtained previously during registration of the product recommender. The digital comparison requires that both the captured image and the reference image be digitized. The product recommender is identified in response to a determination that the captured image and the reference image match digitally to within a predetermined or specified tolerance.

In the technologically useful embodiment in which the captured image comprises both a photograph and a scan of the product recommender, the product recommender may be identified via comparison of both the photograph and the scan of the product recommender obtained in step S210 with the reference photograph and a scan, respectively, of the product recommender previously obtained during registration of the product recommender. In this technologically useful embodiment, the identification of the product recommender requires that the obtained photograph and the obtained scan match the reference photograph and the reference scan, respectively. By requiring a match of both the photograph and scan of the product recommender to identify the product recommender, the technologically useful embodiment assures a significantly higher level of accuracy in identifying the product recommender than if only the photograph or only the scan is used to identify the product recommender. Thus, requiring a match of both the photograph and scan of the product recommender to identify the product recommender, is significantly more than requiring a match of only the photograph or the scan of the product recommender.

At step S230, the computing device may provide information on the product as described infra.

Figure 3:
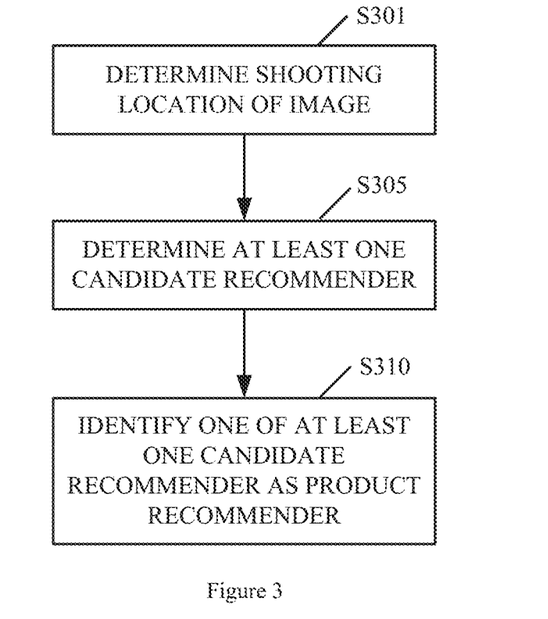
FIG. 3 shows a flowchart of a first exemplary process for identifying a product recommender, in accordance with embodiments of the present invention.

FIG. 3 shows a flowchart illustrating a first exemplary process of identifying a product recommender, in accordance with embodiments of the present invention. As shown in FIG. 3, at step S301, upon obtaining the image, the computing device may determine a location where the image is captured (hereinafter referred to as "a image-capture location"). The image-capture location is defined as the place where the potential customer sees the product recommender. In some embodiments of the present invention, the image-capture location may be determined according to metadata of the image. When the image is captured, the location, time, and camera setting of the image may be recorded as "metadata" of the image. The metadata may be provided to the computing device as a part of the image. Therefore the computing device may extract the location from the metadata, as the image-capture location. In some embodiments of the present invention, the computing device may detect the current location of the potential customer who provides the image, as the image-capture location.

Then at step S305, the computing device may determine at least one candidate recommender who is located in proximity to the image-capture location (i.e., within a predetermined or specified distance from). In some embodiments of the present invention, the computing device may obtain locations of active product recommenders. The product recommender may register the product recommender with the computing device as active when the product recommender wears, carries or uses the products. Then the computing device may detect the locations of the registered active product recommenders. The computing device may calculate a distance difference between the image-capture location and each of the locations of the registered active product recommenders. If the distance difference for any of the registered active product recommenders is within a predetermined range (for example, 15 m), then the corresponding product recommender may be determined as the candidate recommender in accordance.

Then at step S310, the computing device may, in one embodiment, identify one of the at least one candidate recommenders as the product recommender as being the candidate recommender having the least difference distance within the predetermined range. In some embodiments, the computing device may identify the product recommender in response to a selection by the potential customer, wherein the computing device may first provide a respective portrait of the at least one candidate recommender to display on the potential customer's electronic device. Then the potential customer may select one candidate recommender. The computing device may identify the selected candidate recommender as the product recommender.

Figure 4:
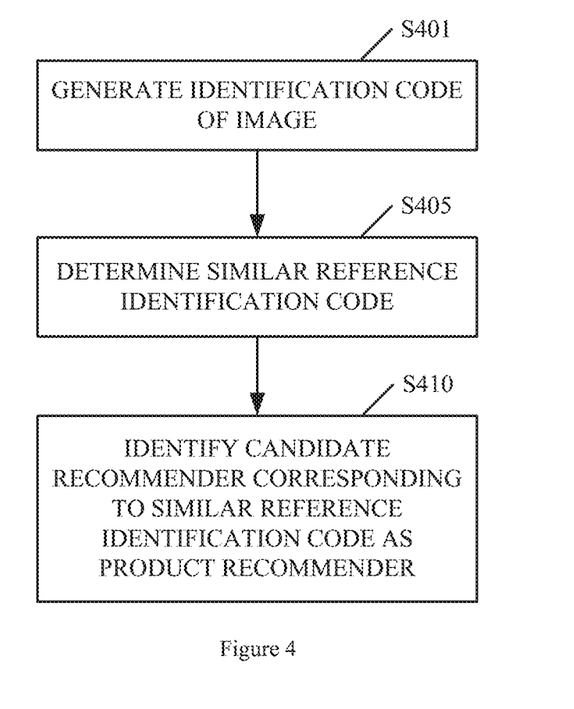
FIG. 4 shows a flowchart of a second exemplary process for identifying a product recommender, in accordance with embodiments of the present invention.

FIG. 4 shows a flowchart illustrating a second exemplary process of identifying a product recommender, in accordance with embodiments of the present invention. As shown in FIG. 4, at step S401, the computing device may generate an identification code of the image of the product (see, for example, Identifier of Product in Table 1). The identification code may be used to represent an outfit of the product recommender in the image. In step S401, the computing device may extract features associated with the product(s) from the image. In some embodiments of the present invention, the computing device may perform an image processing on the image to obtain the features related to the product(s) in the image. The features may be, for example, the product's type, such as shirt, trousers, dress, shoes, bag, hat, etc., shape, color, characteristics, etc. Then the computing device may generate the identification code based on the features. In some embodiments, the identification code may be a two-dimensional barcode; for example, a Quick Response (QR) code. A person skilled in the art will appreciate that many existing method of generation of the two-dimensional barcode may be used.

Then at step S405, the computing device may compare the generated identification code with one or more reference identification codes to determine at least one reference identification code sufficiently similar to the identification code. A generated identification code and a reference code are sufficiently similar if the generated code and reference identification code match to within a predefined or specified tolerance. For example, if the generated and reference identification codes are text, a sufficient match may require that the generated and reference identification codes consist of a same total number of characters and a match of a minimum specified percentage of the total number of characters. As another example, if the generated and reference identification codes are barcodes, a sufficient match may require a minimum specified percentage of total area of the barcodes, in which the respective barcodes match exactly in every detail.

In step S405, the reference identification code is generated based on a reference image provided by a product recommender. In some embodiments of the present invention, when the product recommender wears, carries or uses the product, the product recommender may be photographed and then provide the photographed image to the computing device as a reference image when registering with the computing device. The computing device may store the reference images from the active product recommenders. Then the computing device may generate and store a reference identification code of each of the reference images. The reference identification code may be generated in the same manner as described in step S401. In some embodiments of the present invention, the reference identification code may also be the two-dimensional barcode, such as a QR code.

In step S405, the computing device may calculate a similarity degree between the identification code and each of the stored reference identification codes. The calculation of the similarity degree is known in the art and its detailed description is omitted herein. Then the computing device may determine at least one reference identification code of which the similarity degree is higher than a predetermined threshold, as the similar reference identification code(s) to the identification code generated at step S401. Alternatively, the similar reference identification code may be the reference identification code of which the similarity degree is the highest.

After determining the similar reference identification code(s), at step S410, the computing device may identify a candidate recommender corresponding to one (e.g., having the highest similarity degree) of the similar reference identification code(s) as the product recommender. As described above, there is the association among the product recommender, the reference image, and the reference identification code. Therefore the reference image may be determined according to the reference identification code, and the product recommender may be determined according to the reference image.

Figure 5:
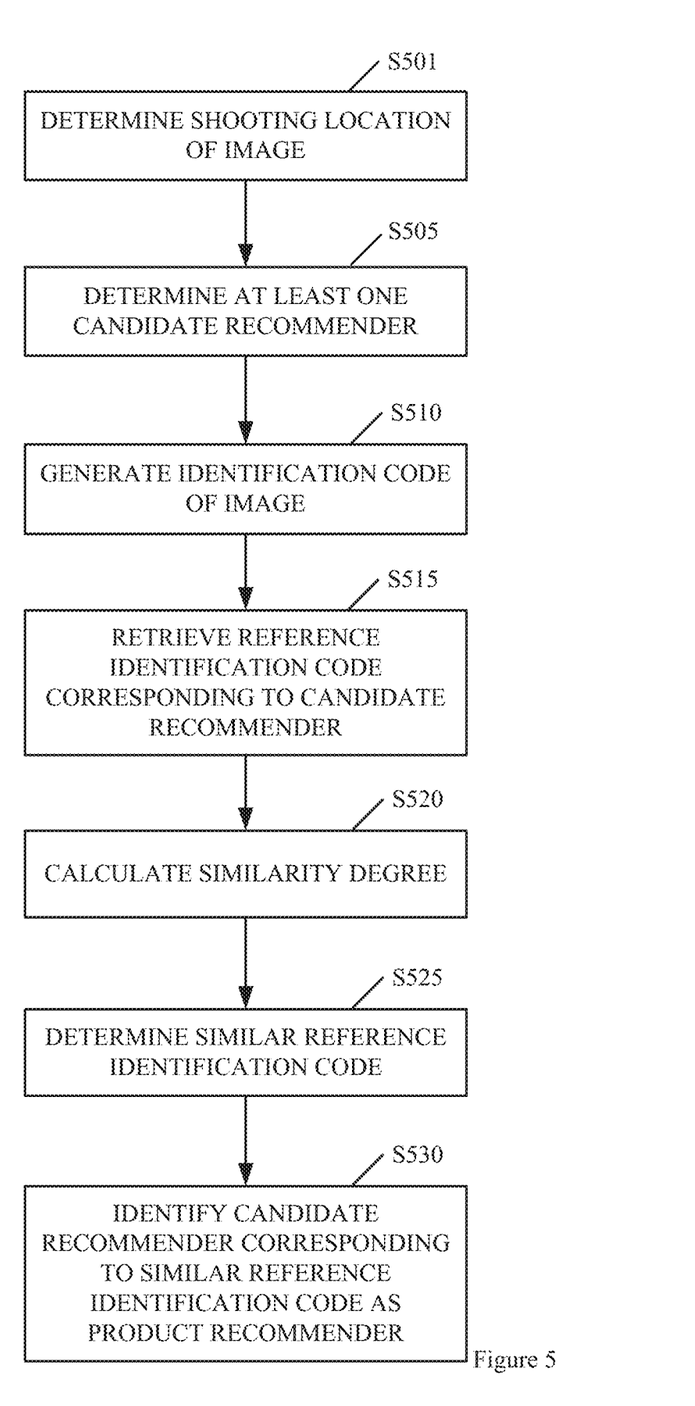
FIG. 5 shows a flowchart of a third exemplary process for identifying a product recommender, in accordance with embodiments of the present invention.

FIG. 5 shows a flowchart of a third exemplary process for identifying a product recommender, in accordance with embodiments of the present invention. This exemplary process in FIG. 5 is a combination of the processes described above in FIGS. 3 and 4. As shown in FIG. 5, after determining at least one candidate recommender(s) located in proximity to the image-capture location (at steps S501 and S505) and generating the identification code of the image (at step S510), at step S515, the computing device may retrieve the reference identification codes corresponding to the at least one candidate recommender. Then at step S520, the computing device may calculate the similarity degree between the identification code of the image and each of the retrieved reference identification codes.

Then at step S525, the computing device may determine at least one reference identification code of which the similarity degree is higher than a predetermined threshold, as the similar reference identification code. Alternatively, the similar reference identification code may be the reference identification code of which the similarity degree is the highest. In one embodiment, the highest similarity degree corresponds to a minimum predefined or specified tolerance discussed supra in conjunction with step 405.

After determining the similar reference identification code(s), at step S530, the computing device may identify the candidate recommender corresponding to one (e.g., having the highest similarity degree) of the similar reference identification code as the product recommender. As described above, there is the association among the product recommender, the reference image, and the reference identification code. Therefore the reference image may be determined according to the reference identification code, and the product recommender may be determined according to the reference image.

Although the step S501 and step S510 are performed sequentially in the above description, a person skilled in the art will appreciate that steps S501 and S510 may be performed in parallel or reversely.

Further, each reference image may be set a lifetime by the computing device. The lifetime may be 24 hours since the reference image is captured, for example. Accordingly, the reference identification code of the reference image has the same lifetime as the lifetime of the reference image. When the reference identification code is within the reference code's lifetime, the reference identification code is valid. When the lifetime of the reference identification code expires, the reference identification code is invalid. Therefore, in some embodiments of the present invention, in step S515, the computing device may only retrieve the reference identification codes in their respective lifetimes. In this way, the invalid reference identification codes of the candidate recommender(s) can be excluded, thereby saving the computation time.

Return to FIG. 2, at step S230, the computing device may provide information on the product, based on the product recommender identified at step S220. In some embodiments of the present invention, the information on the product may include the reference image for the product obtained from the identified product recommender and information of the product. In step S230, the reference image for provision is the reference image used to identify the product recommender in step S410 or step S530. The information of the product may be provided in the form of a text, a picture, or a web link. Further the information may include, inter alia, an identifier of the identified product recommender, reviews on the reference image, current location of the identified product recommender, or any combination thereof. The identifier of the product recommender may be, for example, the name of the product recommender. The review may be an amount of "Like", (the number of recent positive comments, for example). In some embodiments, the information may be sent to and displayed on the electronic device of the potential customer.

Figure 6:
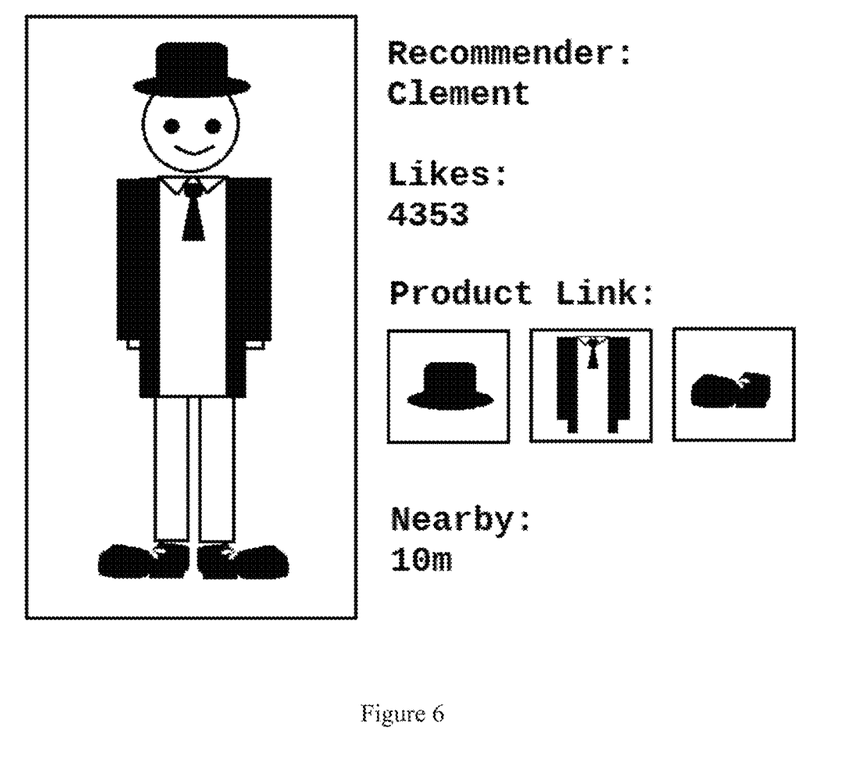
FIG. 6 illustrates an example of information, about a product, displayed on an electronic device of a potential customer, in accordance with embodiments of the present invention.

FIG. 6 illustrates an example of information, about a product, displayed on an electronic device of a potential customer, in accordance with embodiments of the present invention. As shown in FIG. 6, the reference image, the name of the product recommender "Clement", the amount of "Like", the information of each product (denoted by "Product Link"); i.e., clothes, hat, and shoes, and the location of the product recommender are displayed. In this example in FIG. 6, the information of each product is provided by a web link such as URL link represented by an icon. When the icon of the product is selected by the potential customer, the corresponding web page is accessed and a detailed description of the product will be displayed.

It can be seen from the above description that embodiments of the methods of the present invention can provide and present the product(s) timely and accurately to the potential customer when the potential customer sees the product. The methods of the present invention also provide a new way to present the product in daily life. In this way, the presentation of the product, for example the advertisement of the product, does not need any specific or fixed place or medium, and can attract the potential customer passively through the real show of the product recommender. Using the method, the potential customer can get the information on the product(s) the potential customer is interested in when seeing the product recommender.

Figure 7:
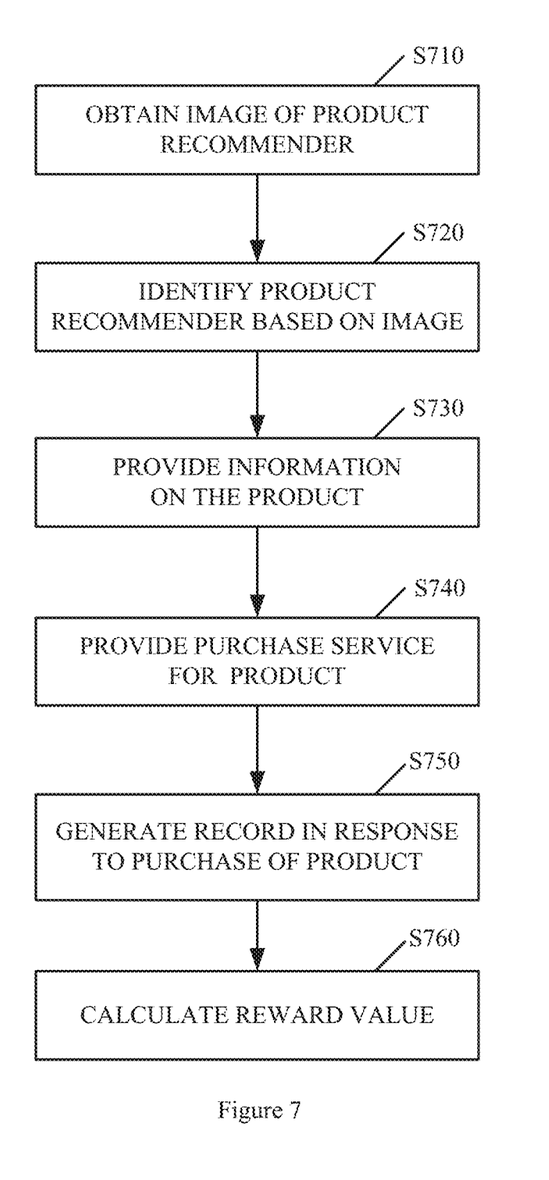
FIG. 7 shows a flowchart of a method for product presentation according to another embodiment of the present invention.

FIG. 7 shows a flowchart of a method for product presentation according to another embodiment of the present invention. In this other embodiment, the computing device may calculate a reward value for the identified product recommender according to a user operation on the product. The user operation may be a click on "Like" button, a purchase operation, or any combination thereof. The following description will take the purchase operation as an example. A person skilled in the art will appreciate that other user operations may alternatively apply.

As shown in FIG. 7, steps S710 to S730 are the same as steps S210 to S230, respectively, and thus the description of steps S710 to S730 is omitted here.

At step S740, the computing device may provide a purchase service for the product. In some embodiments, a purchase link may be generated for each product. The product may be purchased via the purchase link. The purchase link may be provided together with the information on the product. Alternatively, the purchase link for a product may be provided in response to a selection of the product by the potential customer.

In the example as shown in FIG. 6, when the icon of the hat is selected, in addition to the detailed description of the hat, the purchase link of the hat may also be displayed to the potential customer. The potential customer may click the purchase link to buy the hat.

Additionally, at step S750, in response to the purchase of the product, the computing device may generate a record for the purchase transaction indicating an association of the purchase with the product recommender. Therefore the record may reflect the product recommender who promotes the purchased product. In some embodiments of the present invention, the record may comprise the identifier of the product recommender, an identifier of the purchased product, and an identifier of the product provider which provides the purchased product. A person skilled in the art will appreciate that the record may also comprise any other parameters of the purchase transaction, for example, an order number of the purchase.

Then at step S760, the computing device may calculate a reward value for the product recommender according to the record. In some embodiments, the reward value may be related to the total price of the product(s) in the record. For example, the reward value may be calculated as a product of a predetermined factor (e.g., a fraction less than 1) by the total price. In some embodiments of the present invention, the reward value may be calculated as a function of a price of each product in the record. In an example, each product provider may assign a rewarding factor to each product. Different product providers may assign different rewarding factors to the same product. Then the reward value may be calculated as a sum of products of the rewarding factor by the price of the product. Alternatively each product provider may assign the same rewarding factors to each product. In this way, the product recommender can be rewarded due to the purchase of the product which the product recommender promotes.

It can be seen from the above description that the method for product presentation of this embodiment can further provide other services with respect to the presented product; e.g., can enable the potential customer to buy the product which the potential customer sees and is interested in. Moreover, the product recommender can be rewarded.

Figure 8:
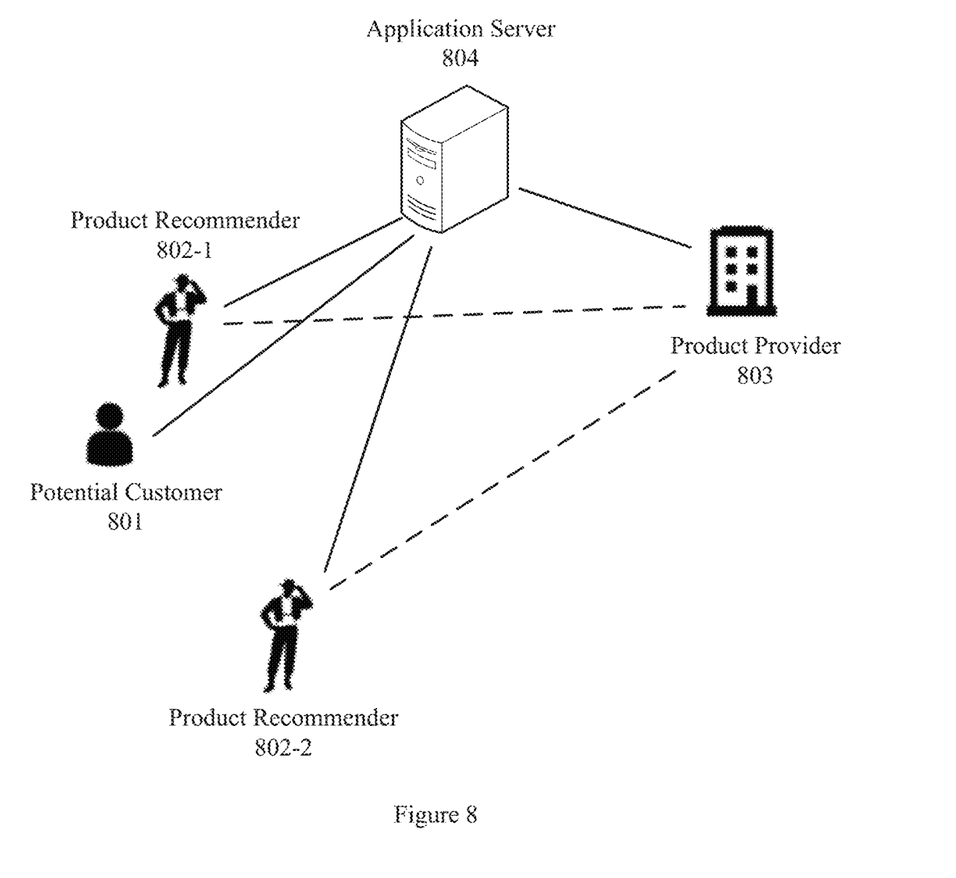
FIG. 8 is a diagram illustrating a product presentation according to embodiments of the present invention.

FIG. 8 is a diagram illustrating a product presentation according to embodiments of the present invention. FIG. 8 shows one potential customer 801, two product recommenders 802-1 and 802-2, one product provider 803, and an application server 804. The potential customer 801 may use the potential customer's mobile phone to communicate with the application server 804. Also the product recommenders 802-1, 802-2 may use their mobile phones (I.e., the mobile phones of the product recommenders 802-1, 802-2) to communicate with the application server 804. The application server 804 may implement the method for product presentation according to the embodiments of the present invention.

The product recommenders 802-1, 802-2 register with the product provider 803, and obtain the products, from the product provider 803, the product recommender's will promote. The product provider 803 may associate the product recommenders 802-1, 802-2 with the products provided to the product recommenders 802-1, 802-2, and provide the association to the application server 804. Subsequently, the product recommenders 802-1, 802-2 are interacting with (e.g., wearing, carrying, using) the products, and may be photographed by themselves (i.e., by the product recommenders 802-1, 802-2). The product recommenders 802-1, 802-2 may register with the application server 804 and provide the images to the application server 804 as the reference images. Then the application server 804 may generate and store a reference identification code for each of the reference images. Each reference identification code may have the same lifetime, such as 24 hours in one embodiment.

Then the product recommenders 802-1, 802-2 may go to a location to display the product. When the potential customer 801 sees the product recommender 802-1 and is interested in the products the product recommender 802-1 is interacting with, the potential customer 801 may take a photograph of the product recommender 802-1, and send the image (i.e., photograph) to the application server 804. Then the application server 804 may generate an identification code for the image.

Then the application server 804 may determine the image-capture location of the image and detect the locations of the product recommenders 802-1, 802-2. If the product recommenders 802-1, 802-2 are in proximity to the image-capture location, the application server 804 may determine the product recommenders 802-1, 802-2 as the candidate recommenders. Then the application server 804 may compare the identification code with the reference identification codes corresponding to the product recommenders 802-1, 802-2 to find the most similar reference identification code. According to the most similar reference identification code, the application server 804 may determine that the product recommender 802-1 is the product recommender in the image.

Then the application server 804 may provide the information on the products worn by the product recommender 802-1 to the potential customer 801. The information may include the reference image corresponding to the most similar reference identification code, the identifier of the product recommender 802-1, and the product information of the products.

The potential customer 801 may select one of the products to buy by clicking on the product. The application server 804 may provide a purchase link of the selected product. Once the potential customer 801 purchases the product successfully, the application server 804 may generate a record including the identifier of the purchased product, the identifier of the product recommender 802-1, and the identifier of the product provider 803. Then the application server 804 may calculate a reward value for the product recommender 802-1 according to the record. The product provider 803 may reward the product recommender 802-1 according to the reward value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computer system to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, said method comprising:
    receiving, by one or more processors of a computer system, a digitized photograph of a product recommender and a digitized scan of the product recommender, said digitized photograph comprising both the product recommender and a product being worn by the product recommender, said product comprising a plurality of items being worn by the product recommender, said digitized photograph being a digitization of a photograph taken by a camera;

digitally matching, by the one or more processors to within a specified first tolerance, the product recommender in the digitized photograph of the product recommender to the product recommender in a digitized reference photograph of the product recommender, wherein the digitized photograph comprises the product recommender's face and the plurality of items being worn by the product recommender; and digitally matching, by the one or more processors to within a specified second tolerance, the product recommender in the digitized scan of the product recommender to the product recommender in a digitized reference scan of the product recommender, wherein a same product recommender is in both the digitized reference photograph and the digitized reference scan, wherein the digitized scan comprises the product recommender's face and the plurality of items being worn by the product recommender, wherein said digitally matching the product recommender in the digitized photograph to the product recommender in the digitized reference photograph and said digitally matching the product recommender in the digitized scan to the product recommender in a digitized reference scan collectively identifies the product recommender as being the same product recommender in the digitized reference photograph and the digitized reference scan, and wherein said digitally matching the product recommender in both the digitized photograph and the digitized scan identifies the product recommender at a significantly higher level of accuracy than if only the product recommender in the digitized photograph or only the product recommender in the digitized scan is used to identify the product recommender; and sending, by the one or more processors to an electronic device, information on the product based on the identified product recommender.

2. The method of claim 1, wherein the information on the product comprises a reference image for the product obtained from the identified product recommender.

3. The method of claim 2, wherein the information on the product further comprises at least one of: an identifier of the identified product recommender, reviews on the reference image for the product, and a current location of the identified product recommender.

4. The method of claim 1, said method further comprising:
calculating, by the one or more processors, a reward value for the identified product recommender according to a user operation on the product.

5. A computer system, comprising one or more processors, one or more memories, and one or more computer readable hardware storage devices, each computer readable hardware storage device not being a signal, said one or more hardware storage device containing program code executable by the one or more processors via the one or more memories to implement a method, said method comprising:

receiving, by the one or more processors, a digitized photograph of a product recommender and a digitized scan of the product recommender, said digitized photograph comprising both the product recommender and a product being worn by the product recommender, said product comprising a plurality of items being worn by the product recommender, said digitized photograph being a digitization of a photograph taken by a camera;

digitally matching, by the one or more processors to within a specified first tolerance, the product recommender in the digitized photograph of the product recommender to the product recommender in a digitized reference photograph of the product recommender, wherein the digitized photograph comprises the product recommender's face and the plurality of items being worn by the product recommender; and digitally matching, by the one or more processors to within a specified second tolerance, the product recommender in the digitized scan of the product recommender to the product recommender in a digitized reference scan of the product recommender, wherein a same product recommender is in both the digitized reference photograph and the digitized reference scan, wherein the digitized scan comprises the product recommender's face and the plurality of items being worn by the product recommender, wherein said digitally matching the product recommender in the digitized photograph to the product recommender in the digitized reference photograph and said digitally matching the product recommender in the digitized scan to the product recommender in a digitized reference scan collectively identifies the product recommender as being the same product recommender in the digitized reference photograph and the digitized reference scan, and wherein said digitally matching the product recommender in both the digitized photograph and the digitized scan identifies the product recommender at a significantly higher level of accuracy than if only the product recommender in the digitized photograph or only the product recommender in the digitized scan is used to identify the product recommender; and sending, by the one or more processors to an electronic device, information on the product based on the identified product recommender.

6. A computer program product, comprising one or more computer readable hardware storage devices having computer readable program code stored therein, each computer readable hardware storage device not being a signal, said program code containing instructions executable by one or more processors of a computer system to implement a method, said method comprising:

receiving, by the one or more processors, a digitized photograph of a product recommender and a digitized scan of the product recommender, said digitized photograph comprising both the product recommender and a product being worn by the product recommender, said product comprising a plurality of items being worn by the product recommender, said digitized photograph being a digitization of a photograph taken by a camera;

digitally matching, by the one or more processors to within a specified first tolerance, the product recommender in the digitized photograph of the product recommender to the product recommender in a digitized reference photograph of the product recommender, wherein the digitized photograph comprises the product recommender's face and the plurality of items being worn by the product recommender; and digitally matching, by the one or more processors to within a specified second tolerance, the product recommender in the digitized scan of the product recommender to the product recommender in a digitized reference scan of the product recommender, wherein a same product recommender is in both the digitized reference photograph and the digitized reference scan, wherein the digitized scan comprises the product recommender's face and the plurality of items being worn by the product recommender, wherein said digitally matching the product recommender in the digitized photograph to the product recommender in the digitized reference photograph and said digitally matching the product recommender in the digitized scan to the product recommender in a digitized reference scan collectively identifies the product recommender as being the same product recommender in the digitized reference photograph and the digitized reference scan, and wherein said digitally matching the product recommender in both the digitized photograph and the digitized scan identifies the product recommender at a significantly higher level of accuracy than if only the product recommender in the digitized photograph or only the product recommender in the digitized scan is used to identify the product recommender; and sending, by the one or more processors to an electronic device, information on the product based on the identified product recommender.

\* \* \* \* \*